UNITED STATES PATENT OFFICE.

CHRISTIAN RUDOLPH, OF OFFENBACH-ON-THE-MAIN, GERMANY, ASSIGNOR TO THE FIRM OF K. OEHLER, OF SAME PLACE.

BROWN AZO DYE.

SPECIFICATION forming part of Letters Patent No. 558,612, dated April 21, 1896.

Application filed November 13, 1895. Serial No. 568,811. (Specimens.)

*To all whom it may concern:*

Be it known that I, CHRISTIAN RUDOLPH, chemist, doctor of philosophy, residing at Offenbach-on-the-Main, Germany, have invented new and useful Improvements in and Relating to a New Brown Azo Dyestuff, of which the following is a specification.

My investigations about the azo dyestuffs deriving from diazotized toluylendiamin sulfo-acid ($CH_3 : NH_2 : SO_3H : NH_2 = 1:2:4:6$) led me to the fact that not only the so-called "paradiamido" (benzidin, paraphenylendiamin, &c.) are suitable for the preparation of azo coloring-matters, dyeing cotton directly, but that also certain derivatives of metadiamins may be used for the same purpose. Thus brown, orange and yellow azo dyestuffs, dyeing unmordanted cotton, have already been prepared by using the diazotized toluylendiamin sulfo-acid, deriving from 1:2:6 metatoluylendiamin. So I found on closer examination that the orange dyestuff, the constitution of which is represented by the formula,

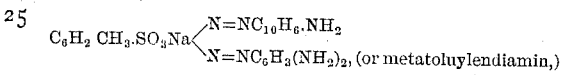

is susceptible of being further combined with diazotized aromatic sulfo-acids—as, for instance, diazo-naphthionic acid—thus yielding a very fast yellow-brown cotton dyestuff.

The following is an example in which manner this valuable dyestuff may be prepared. By parts always read parts by weight. Dissolve ten and one-tenth (10.1) parts of toluylendiamin sulfo-acid ($CH_3.NH_2.SO_3H.NH_2 = 1.2.4.6$) in about twenty-five (25) parts of caustic soda-lye (containing eight per cent. (8%) of $Na OH$) and add a solution of six and nine-tenths (6.9) parts of sodium nitrite in two hundred (200) parts of water and the necessary quantity of ice. Pour the whole into a mixture of forty-three (43) liters of muriatic acid of $22\frac{1}{2}°$ Baumé ($36.3\%$ HCl) in two hundred (200) parts of water cooled with ice. After diazotizing run the solution of the diazo body into a solution, cooled down to zero, of nine (9) parts of beta-naphthylamin hydrochlorid in five hundred (500) parts of water. Then mix the intermediate product thus obtained with a solution of ten and three-tenths (10.3) parts of metaphenylendiamin sulfate, or eleven (11) parts of toluylendiamin sulfate, and seventy-five (75) parts of sodium acetate in three hundred (300) parts of water. As soon as the formation of the dyestuff is completed add gradually thirty-three (33) parts of soda, while heating to boiling, then cool again to zero degree. Thus a dyestuff results having the formula

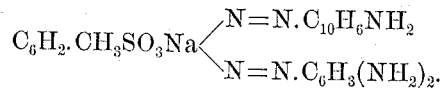

Now make diazo naphthionic acid, prepared from thirteen (13) parts of the sodium salt of naphthionic acid in the usual manner, and let it act upon this dyestuff during a whole day, stirring continuously. Then heat slowly the mass, neutralize with soda, precipitate with common salt, filter, press, and dry.

The new dyestuff thus obtained forms a deep-dark-brown powder, which is soluble in concentrated sulfuric acid to a dirty-violet solution, in water to a yellowish-brown solution, from which, on adding hydrochloric acid, the dyestuff acid falls down as a brown flocculent precipitate.

Now what I claim, and desire to secure by Letters Patent, is—

1. The process of making a new brown azo dyestuff consisting in first combining diazotized metatoluylendiamin sulfo-acid with one molecule of beta-naphthylamin and one molecule of a metadiamin and afterward acting upon the thus formed intermediate product with one molecule of diazo-naphthionic acid, substantially as described.

2. As a new article of manufacture the brown azo dyestuff herein described derived from diazotized toluylendiamin sulfo-acid which dyes on unmordanted cotton a yellow brown, and which is characterized by the following properties;—it forms a deep-dark-brown powder which is soluble in concentrated sulfuric acid to a dirty violet solution and soluble in water to a yellowish-brown solution from which on adding hydrochloric acid the dyestuff acid falls down as a brown flocculent precipitate, all substantially as herein set forth.

In testimony whereof I have signed my name to this specification in the presence of two subscribing witnesses.

CHRISTIAN RUDOLPH.

Witnesses:
JEAN GRUND,
ALVESTO S. HOGUE.